United States Patent
Head et al.

(10) Patent No.: US 10,474,649 B2
(45) Date of Patent: Nov. 12, 2019

(54) PROVIDING ACTION CORRECTIONS USING A DUAL MODEL SYSTEM

(71) Applicant: Halo Tech Corp., Menlo Park, CA (US)

(72) Inventors: Austen Head, San Francisco, CA (US); Xiao Xu, Sunnyvale, CA (US); Brian Axe, Portola Valley, CA (US); Ian Gregg, San Jose, CA (US)

(73) Assignee: Halo Tech Corp., Menlo Park, CA (US)

( * ) Notice: Subject to any disclaimer, the term of this patent is extended or adjusted under 35 U.S.C. 154(b) by 490 days.

(21) Appl. No.: 15/277,940

(22) Filed: Sep. 27, 2016

(65) Prior Publication Data
US 2018/0089234 A1 Mar. 29, 2018

(51) Int. Cl.
*G06F 17/00* (2019.01)
*G06F 16/215* (2019.01)

(52) U.S. Cl.
CPC .................... *G06F 16/215* (2019.01)

(58) Field of Classification Search
CPC ...................................... G06F 16/215
USPC ................................. 707/600–899
See application file for complete search history.

(56) References Cited

U.S. PATENT DOCUMENTS

2014/0114926 A1* 4/2014 Anderson ......... G06F 16/24544
707/687

* cited by examiner

*Primary Examiner* — Isaac M Woo
(74) *Attorney, Agent, or Firm* — Van Pelt, Yi & James LLP

(57) ABSTRACT

An action corrections system includes an interface and a processor. The interface is configured to receive generic data and proprietary data. The processor is configured to determine a generic data entity; match the generic data entity to a proprietary data entity to form a joined entity; determine a response variable from the proprietary data; determine a need for action corrections in regards to the joined entity based at least in part on the response variable; and determine one or more action corrections in regards to the joined entity.

19 Claims, 11 Drawing Sheets

Model Builder Flow for a Descriptive Model

Model Builder for Action Corrections

PROVIDING ACTION CORRECTIONS USING A DUAL MODEL SYSTEM

BACKGROUND OF THE INVENTION

A provider of services may service multiple entities. The provider may have multiple goals in regards to servicing the multiple entities. The provider may desire to quantifiably measure its performance in regard to its service and determine how to improve its performance.

BRIEF DESCRIPTION OF THE DRAWINGS

Various embodiments of the invention are disclosed in the following detailed description and the accompanying drawings.

DETAILED DESCRIPTION

Figure 1:
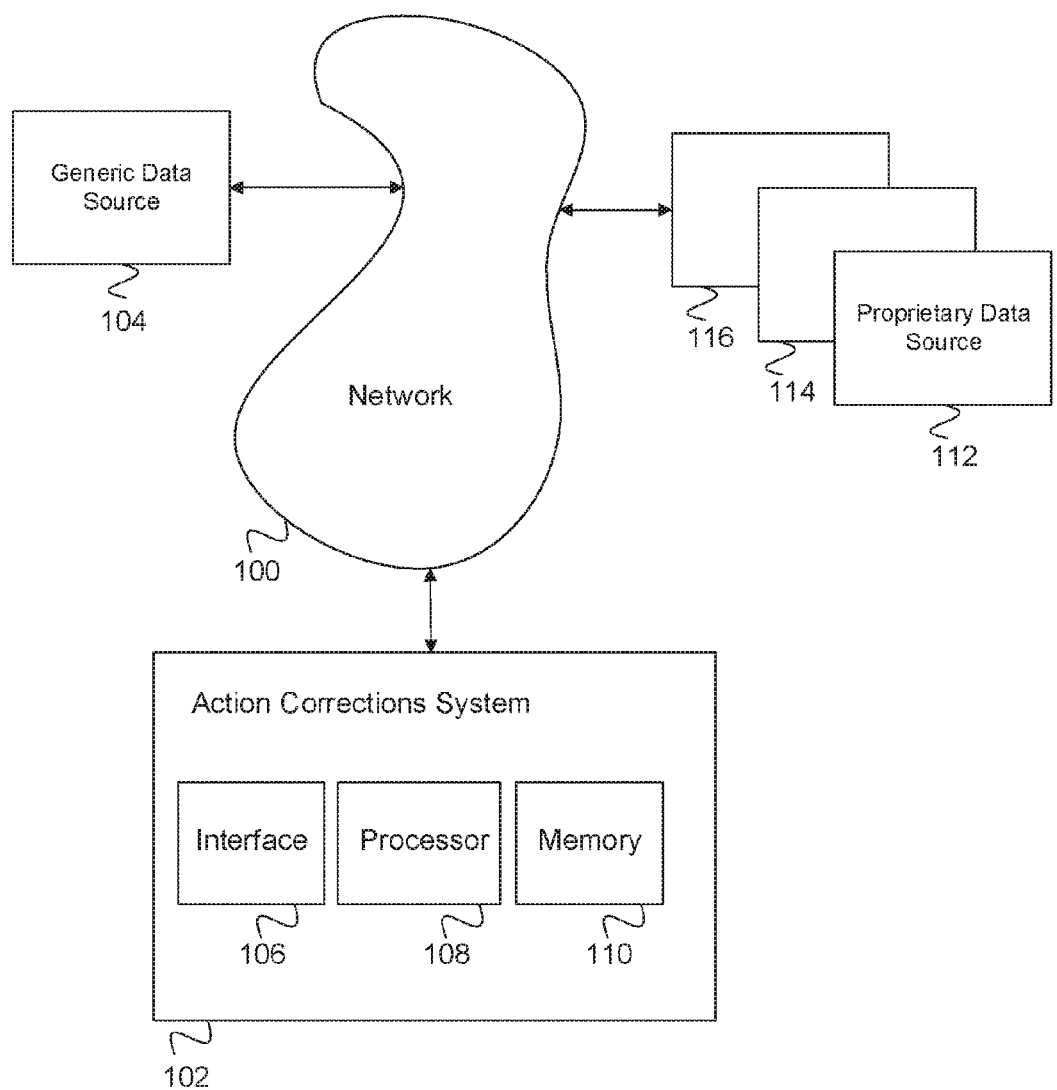
FIG. 1 is a diagram illustrating an embodiment of an action corrections system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

An action corrections system is disclosed. The system comprises an interface configured to receive generic data and proprietary data. The system additionally comprises a processor configured to determine a generic data entity, match the generic data entity to an proprietary data entity to form a joined entity, determine a response variable from the proprietary data, determine a need for action corrections in regards to the joined entity based on the response variable, and determine one or more action corrections in regards to the joined entity.

In some embodiments, a user or client of the action corrections system has multiple entities. For example, the client may service multiple entities. In some embodiments, the action corrections system is used to create a model of entity performance based on predictive factors. The action corrections system may extract descriptive information on the entities from generic data sources and extract performance information on the client from client proprietary data. In some embodiments, the entity performance is measured or determined based on a response variable. In some embodiments, the model is used to predict a performance for a specific entity based on information relating to the entity from generic data sources. In some embodiments, the action corrections system determines one or more action corrections aimed to help the entity achieve its predicted performance. For example, the action of clicking on an educational or sales document included in an email may be predictive of future sales for a specific customer context as predicted by the predictive model.

FIG. 1 is a diagram illustrating an embodiment of an action corrections system. In the example shown, generic data source 104, action corrections system 102, and proprietary data sources communicate via network 100. In the example shown, the proprietary data sources comprise proprietary data source 112, proprietary data source 114, and proprietary data source 116. In some embodiments, the number of proprietary data sources is equal to the number of users or clients the action corrections system is used by. For example, each client has its own proprietary data source. In some embodiments, a proprietary data source cannot be shared with the public or with a client not in ownership of it. In some embodiments, action corrections system 102 is a dual-mode system that allows a user to determine results using the user's own proprietary data in combination with generic data sources without compromising confidentiality of the proprietary data.

In some embodiments, generic data source 104 comprises publically available information. In various embodiments, the generic data comprises one or more of the following: a website, a public database, a published paper, an organization, an author, information on one or more entities, or any other appropriate data. In some embodiments, the generic data is data from an entity's official website. The generic data may be data made available under the Freedom of Information Act. The generic data may be data that has been purchased or bought by the party owning the action corrections system. The generic data may be data that is allowed to be shared across multiple clients of the action corrections system.

In various embodiments, network 100 comprises one or more of the following: a local area network, a wide area network, a wired network, a wireless network, the Internet, an intranet, a storage area network, or any other appropriate communication network. In the example shown, action corrections system 102 comprises interface 106, processor 108, and memory 110. In some embodiment, action corrections system 102 interacts with a client of the system via interface 106. For example, the client or an employee of the client may enter the client name or a location of the client proprietary data. The client may enter the response variable that entity performance is calculated based on. In some embodiments, the response variable is determined by the action corrections system based on a relevant set of data. For example, the action corrections system may determine that several categories of products are relevant to an entity and set the response variable to a total number of dollars spent on products that belong to the specified categories. In some embodiments, processor 108 determines results based on client inputs and stores intermediary or final results in memory 110. A client may enter one or more response variables or weights of factors.

Figure 2:
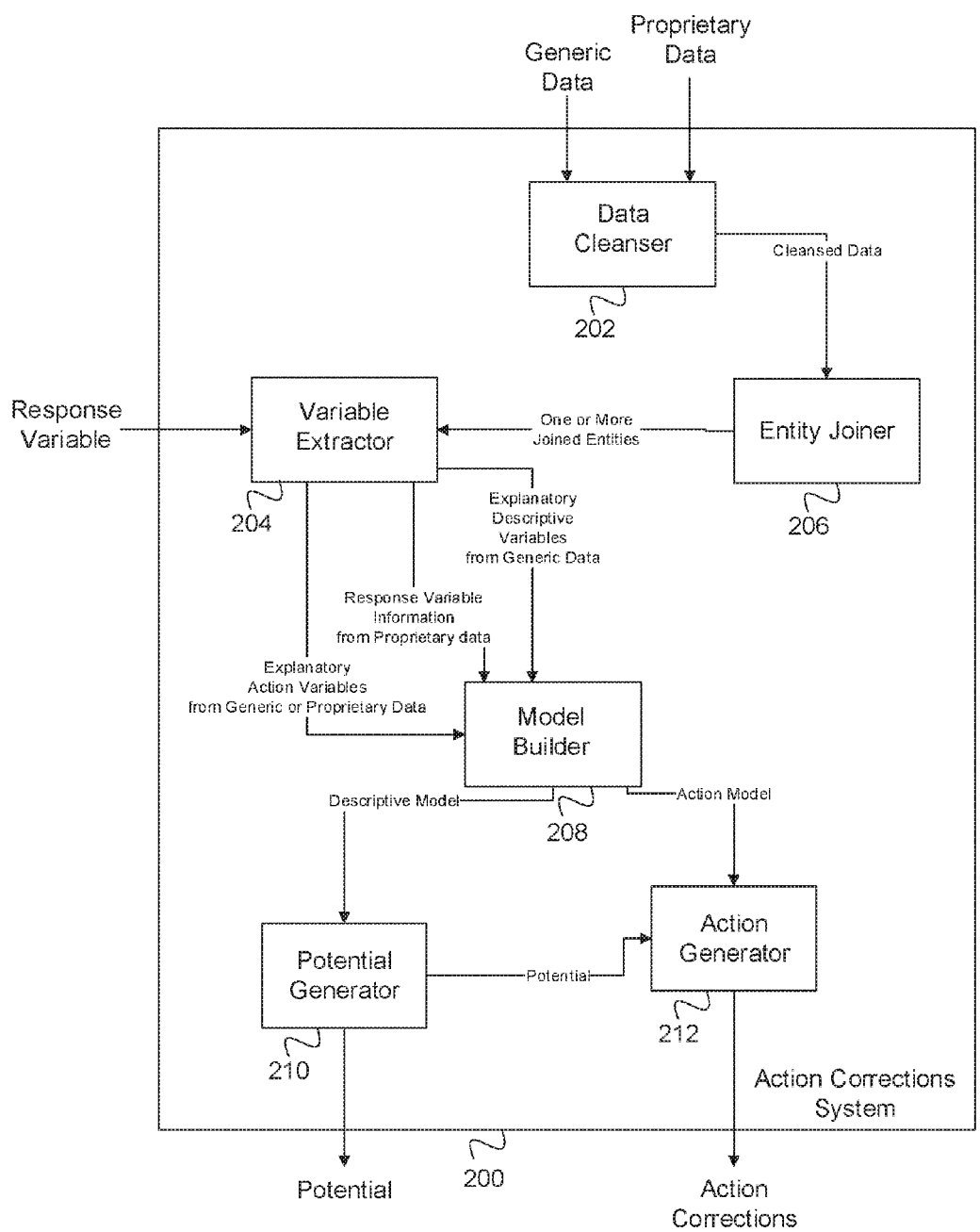
FIG. 2 is a block diagram illustrating an embodiment of an action corrections system.

FIG. 2 is a block diagram illustrating an embodiment of an action corrections system. In the example shown, action corrections system 200 comprises data cleanser 202, variable extractor 204, entity joiner 206, model builder 208, and potential generator 210. In the example shown, generic data and proprietary data are provided to data cleanser 202. In some embodiments, the processor cleanses the generic data using data cleanser 202. In various embodiments, cleansing the generic data comprises one or more of the following: parsing the generic data, determining an entity identifying information, determining an entity hierarchical level, determining an entity category, determining a subject matter, grouping by subject matter, or any other appropriate action. In some embodiments, cleansing the generic data includes deleting extraneous white spaces, parsing comma separated files, or scraping websites. In some embodiments, internal analysis is performed as part of the process of cleansing the data. For example, the generic data may include grants granted to entities, and the grants may be grouped based on topic. An entity may be noted to have many grants of a specific topic or the entity may be noted to be associated with a specific topic. In some embodiments, the data cleanser recognizes patterns or trigger words. In some embodiments, the data cleanser processes the data to allow it to be used in later steps of the action corrections system. The data cleanser may extract the data from data sources and transform the data for purposes of querying and analysis.

In some embodiments, data cleanser 202 extracts entity information from the generic data and proprietary data. In some embodiments, data cleanser 202 cleanses all data (e.g. formatting, grouping, etc.) and then determines whether the data comprises entity information. In some embodiments, data cleanser 202 first determines whether the data comprises entity information before cleansing the data. In some embodiments, data cleanser 202 does not process or cleanse data that is determined not to be entity information. In various embodiments, entity information comprises an address, a geographic region, a demographic, a name, a statistic about the entity, a descriptor of the entity, a category of business or research of the entity, or any other appropriate entity information. In some embodiments, the entity is a computer resources client. In some embodiments, entity information comprises a size of a code base, a type of a code base, computer resource usage measurements, a time of usage, a type of service used, or a type of specialized server required.

In the example shown, cleansed data is provided from data cleanser 202 to entity joiner 206. In some embodiments, entity joiner 206 organizes or consolidates the cleansed data, which comprises entity information. In some embodiments, an entity profile is created based on the generic data and the proprietary data. In some embodiments, entity data from the generic data is processed first and an entity profile is created for each distinct entity identified in the generic data. The entity profiles created based on generic data may be saved as part of the action corrections system. In some embodiments, the generic data entity is matched to a proprietary data entity in the event an entity identifying information of the generic data is the same as an entity identifying information of the proprietary data. For example, the proprietary data is processed after the generic data. In the event a match is found, entity information from the proprietary data may be saved in an entity profile created based on entity information from the generic data. In some embodiments, the entity joining information is accessible only to a specific client or owner of the proprietary data. In some embodiments, entity joining occurs anew for every client of the action corrections system.

In some embodiments, an entity determined from the generic data (e.g. generic data entity) is matched to an entity determined from the proprietary data (e.g. proprietary data entity) based on an entity hierarchical level. Entity hierarchical levels may exist for various types of organizations such as corporations, non-profits, school systems, or governments. For example, an entity information may include a university system, a university satellite campus, and a laboratory. An entity information may include a company, a division of the company, a location of a company, a section of the company, a subdivision of a company, etc. An entity profile may be created on the university system level to consolidate information related to the entire university system while another entity profile may be created on the laboratory level that contains specific information related to the laboratory. In some embodiments, creating entity hierarchical levels increases flexibility in the action corrections system. In some embodiments, creating entity hierarchical levels allows action corrections to be provided in greater detail or with increased accuracy. In the example shown, entity joiner 206 provides one or more joined entities to variable extractor 204.

In the example shown, variable extractor 204 receives a response variable as an input. In some embodiments, the response variable is received by a client or user of the action corrections system. In some embodiments, the response variable is preset in the action corrections system. In some embodiments, the response variable is a quantifiable element present in the cleansed data. In some embodiments, the response variable is a quantifiable element present in the entity information. For example, the response variable may be a percentage usage of computer resources allocated to an entity or a productivity of a server.

In some embodiments, variable extractor 204 extracts one or more variables from the one or more joined entities. The one or more joined entities may be constructed from the generic data and proprietary data. In some embodiments, one or more variables are extracted from the generic data. In some embodiments, the processor extracts one or more variables from the generic data, wherein the one or more variables pertain to one or more entities. In some embodiments, the one or more variables are saved as part of the action corrections system. In some embodiments, upon receiving the response variable, variables that are extracted are called explanatory variables. In some embodiments, upon extracting the explanatory variables, those explanatory variables are used in a predictive model to predict the response variable. In some embodiments, the method of constructing variables used as explanatory variables in a model may be selected from saved variable construction methods initially stored in the action corrections system. In some embodiments, the explanatory variables may be selected from saved explanatory variables stored within the action corrections system. For example, the response variable may be an indicator of whether a server failed within the past week. Data annotating the joined entities used to construct explanatory variables may constitute a service requested by an entity using the server, a research topic that an entity using the server pursues, other computer resources allocated to the entity, a time zone of the entity, or any other source of data associated with the entity. In various embodiments, standard statistical and machine learning tools and techniques such as natural language processing, spatial analysis, multidimensional scaling, unsupervised learning, topic modeling, collaborative filtering, network analysis, or any other appropriate methods are used to construct useful variables from the data.

In some embodiments, a data source is a server utilization history, where the data source annotates entities from which explanatory variables are constructed. For each entity, average utilization percent of each server may be calculated for each of the previous N hours (e.g., 168 hours) creating a point in N dimensional space (e.g., 168 dimensional space) for each server. Using principal component analysis, the data may be projected onto an M-dimensional space (e.g., an eight-dimensional space). Each of the M dimensions may be able to be used as a constructed explanatory variable. The M variables extracted from the history of server utilizations may be passed to a model building process as proprietary explanatory action variables wherein the actionable insight is to change the server utilization for any servers that are similar in terms of utilization history to servers that failed. An additional explanatory variable from the history of server utilization may be the single dimensional value of maximum server utilization over the previous X hours (e.g., 2 hours). While there may be some variables constructed one dimension at a time, in some embodiments a large number of variables are extracted simultaneously by using standard statistical and machine learning techniques.

In the example shown, variable extractor 204 provides explanatory action variables constructed from generic data, response variable information constructed from proprietary data, and explanatory descriptive variables constructed from generic data to model builder 208. In some embodiments, descriptive variables are constructed from proprietary data. For example, a client's proprietary data may comprise information regarding various entities such as demographics of people who have purchasing power at the entities. Explanatory descriptive variables may include variables describing an entity, such as an entity's data usage patterns, an entity geographic region, an entity demographic, or any other entity information. In some embodiments, explanatory action variables include information on actions done to an entity by a client or actions taken by a client in reference to the entity. For example, explanatory action variables may include whether a memory wipe was performed on the servers before providing them to an entity, whether the entity was trained on use of a computer resource provided to them, whether the entity was counseled on the best computer resource suited for their needs, or any other variable. In some embodiments, response variable information from proprietary data includes information for each entity belonging to the client of the action corrections system. For example, the productivity of servers provided to each entity of the client is included in the response variable information.

In some embodiments, the processor determines one or more explanatory variables that are predictive of the response variable. The one or more variables that are determined to be explanatory variables in relation to the response variable may be further filtered to determine explanatory variables that are predictive of the response variable. Predictive variables may be determined by providing all the explanatory variables and the response variable to a statistical model. Predictive variables may be determined via machine learning. In some embodiments, model builder 208 determines explanatory variables predictive of the response variable based on explanatory descriptive variables from the generic data and response variable information from the proprietary data. In some embodiments, variable extractor 204 extracts the correlative variables. The explanatory descriptive variables from generic data provided by variable extractor 204 may be those determined to be predictive of the response variable.

In some embodiments, model builder 208 generates a descriptive model based on explanatory descriptive variables from the generic data and response variable information from the proprietary data. In some embodiments, model builder 208 builds a model for a client of the action corrections system based on all the entities the client services. In some embodiments, the model is built based on independent entity-related variables that are determined to be predictive of the response variable. The model may predict the response variable based on input explanatory variables of firmographic data that describes the entities. The model may predict the potential opportunity of that response variable based on action explanatory variables.

In some embodiments, a potential is generated for the joined entity based on one or more variables extracted from the generic data that are predictive of the response variable. In the example shown, a model is provided by model builder 208 to potential generator 210. In the example shown, potential generator 210 provides a potential. Potential generator 210 may determine a potential for an entity. Based on the model, a predicted performance may first be determined for the entity based on traits of the entity. The predicted performance may be based on the response variable. For example, the model may correlate large data science firms to a high percentage use of computing resources, wherein the response variable is the percentage use of computing resources. An entity profile may be compiled for a new entity that the client has not previously serviced. Based on the entity profile, the entity may be determined to be a large data science firm. The new entity may be predicted to have high utilization of its allocated servers. In some embodiments, in creating predictions, the potential generator uses a mapping or gain schedule included in the model to predict a performance of the entity while following best practices in statistics and machine learning including but not limited to insuring that the model to not over fit. In the event that the entity has not previously been serviced by the client, the potential may be the predicted performance.

In some embodiments, a potential is generated for an entity the client already services. The model may be created using the entity information. A predicted performance may be determined for the entity by fitting the model to the entity's descriptors (e.g. information in the entity's profile).

The potential may be generated based in part on an actual performance of the joined entity. For example, the predicted performance of the entity may be compared to the actual performance of the entity. In some embodiments, the potential is the difference between the predicted performance and the actual performance of an entity. In the event the potential is positive, the entity may be determined to be underperforming. In the event the potential is negative, the entity may be determined to be performing above expectations. In some embodiments, an over performing entity is analyzed to determine variables predictive of high performance.

A need for action corrections may be determined based on the potential. In the example shown, potential generator 210 provides potential to action generator 212. Model builder 208 may construct an action model. The action model may be an input to an action generator that provides one or more action corrections in the event the potential indicates a need for action corrections. In some embodiments, the one or more action corrections are determined in the event the need for action corrections is determined to exceed a threshold. The threshold may be set such that action corrections are not determined in the event an entity is underperforming by a small amount. In some embodiments, the threshold introduces flexibility in the system or accounts for known patterns in the response variable. In some embodiments, the threshold is modified based on conditions, time, or season. For example, a threshold may be set to ignore a large number of idle servers around a holiday season due to known low usage during that time period.

In the event action corrections are determined for an entity, action information pertaining to the joined entity may be extracted from the proprietary data or generic data. In some embodiments, the one or more action corrections are determined based on variables extracted from the action information that are determined to be predictive of an improved performance. In the example shown, explanatory action variables from generic data or proprietary data are extracted via variable extractor 204. In some embodiments, model builder 208 builds an action model. For example, the model may associate a combination of actions such as training the entity in use of a specialized server, or advising the entity on an appropriate computing tool for their applications with a high percentage use of computing resources. The action corrections system may take into account whether the client has been performing actions predictive of high performance with the entity. In the example shown, model builder 208 provides an action model. Action generator 212 receives the action model and provides one or more action corrections. In some embodiments, the one or more actions corrections comprise changes to the current actions performed by suggesting new actions be performed or current actions be ceased.

In some embodiments, the one or more action corrections are determined based on multiple response variables, wherein the response variables are each weighted for each entity. For example, multiple models may be built for multiple response variables. For each entity, action corrections may be determined for some or all of the response variables. The action corrections may be weighted based on the weights of the response variables provided, and a consolidated action corrections plan be provided to the client in regards to the entity. In some embodiments, the client may prefer to perform the same set of action corrections on a set of multiple entities. Multiple models may be built for the multiple entities and multiple sets of action corrections determined. In some embodiments, the final action corrections provided is a weighted combination of the multiple sets of action corrections based on weights provided for the importance of each entity.

Figure 3:
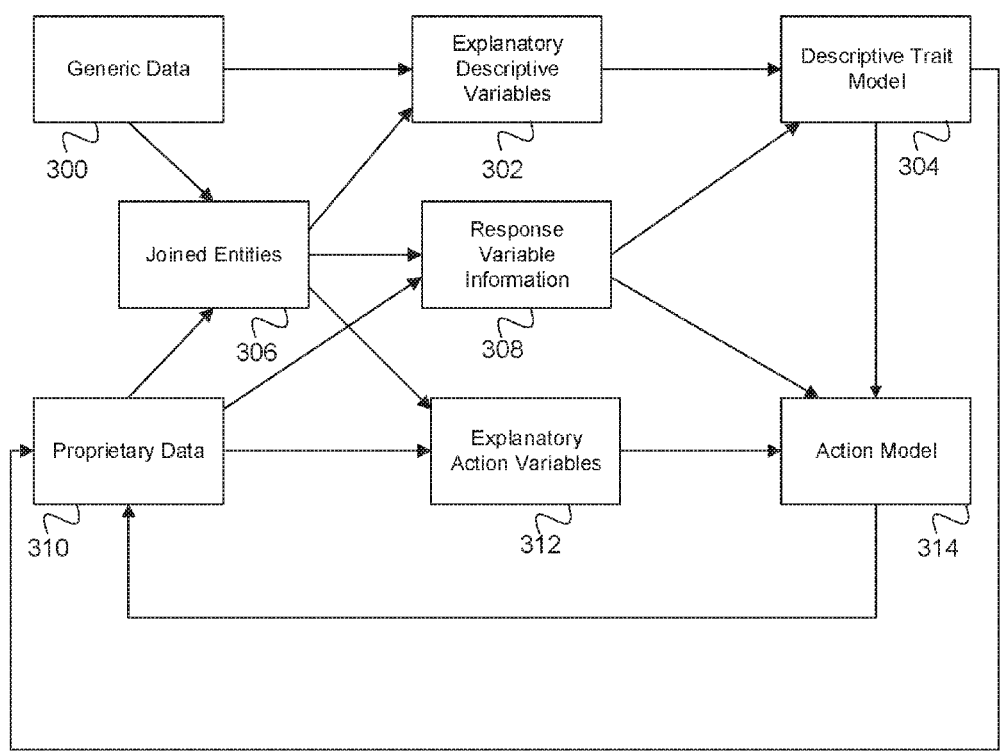
FIG. 3 is a diagram illustrating an embodiment of data transformations in an action corrections system.

FIG. 3 is a diagram illustrating an embodiment of data transformations in an action corrections system. In the example shown, generic data 300 and proprietary data 310 are transformed into joined entities 306. For example, data from generic data 300 and proprietary data 310 is extracted, loaded, transformed, or otherwise processed to create joined entities 306. In the example shown, explanatory descriptive variables 302 are extracted from joined entities 306 and generic data 300. Explanatory descriptive variables 302 may comprise a descriptor that is common to multiple entities that is explanatory in relation to the response variable. For example, in the event the response variable is a percentage use of allocated computer resources, power consumed by the entity may not be considered an explanatory variable.

In the example shown, response variable information 308 is extracted from joined entities 306 and proprietary data 310. The response variable may be a trait that the client sees as desirable in its entities. In some embodiments, the response variable information from the proprietary data is limited to a quantifiable response variable value and an entity identification. In some embodiments, the proprietary data comprises limited information on the entity. Utilizing joined entities 306 may be required in order to match the entity response variable value to a host of information on the entity, which in some embodiments is compiled in an entity profile.

In the example shown, descriptive trait model 304 is based on explanatory descriptive variables 302 and response variable information 308. Machine learning or data processing algorithms may be used to determine a model which receives input explanatory variables that describe an entity and outputs both a prediction of the response variable for that entity and predictions about the impacts or weights each of those input explanatory variables has on the response variable prediction. In some embodiments, descriptive trait model 304 is used to evaluate an entity's performance. In some embodiments, the action corrections system is used by a client to provide action correction recommendations in regards to the entity that a client could enact. Descriptive trait model 304 and action model 314 may provide outputs that are used in providing the recommendations.

In the example shown, explanatory action variables 312 are extracted from joined entities 306 and proprietary data 310. In some embodiments, explanatory action variables comprise actions that the client has performed on entities in the past. Variables that comprise actions that the entity has done or could do may be included in explanatory action variables 312. For example, explanatory action variables may comprise variables (e.g. constructed using statistical and machine learning tools and techniques) from a client's customer relationship management databases, sales and marketing databases, email logs or servers, phone or other communication transcripts, enterprise resource planning data regarding products sold or discounts offered, or other logs of interactions between a client and its customers. In the example shown, action model 314 is created based on response variable information 308 and explanatory action variables 312. In some embodiments, action model 314 is created in the same way as descriptive trait model 304, with the exception that action variables are used instead of descriptive variables. In some embodiments, action model 314 is created in the event that descriptive trait model 304 provides a positive potential to action model 314. In the event an entity's actual performance does not match its predicted performance according to descriptive trait model 304, action model 314 may comprise action information pertaining to the entity. The entity's action information may be used to identify actions predictive of increased or decreased performance.

In the example shown, descriptive trait model 304 and action model 314 provide feedback to proprietary data 310. For example, proprietary data 310 may include information on actions previously suggested to a client regarding an entity, whether the action was executed, and whether the execution of the action resulted in a change in performance. In some embodiments, feedback allows the action corrections system to differentiate between variables that cause increased performance and variables predictive of increased performance. In some embodiments, the system uses correlated variables during initiation of the system and transitions to using variables which after over multiple iterations indicate causal relationships with the response variable.

Figure 4:
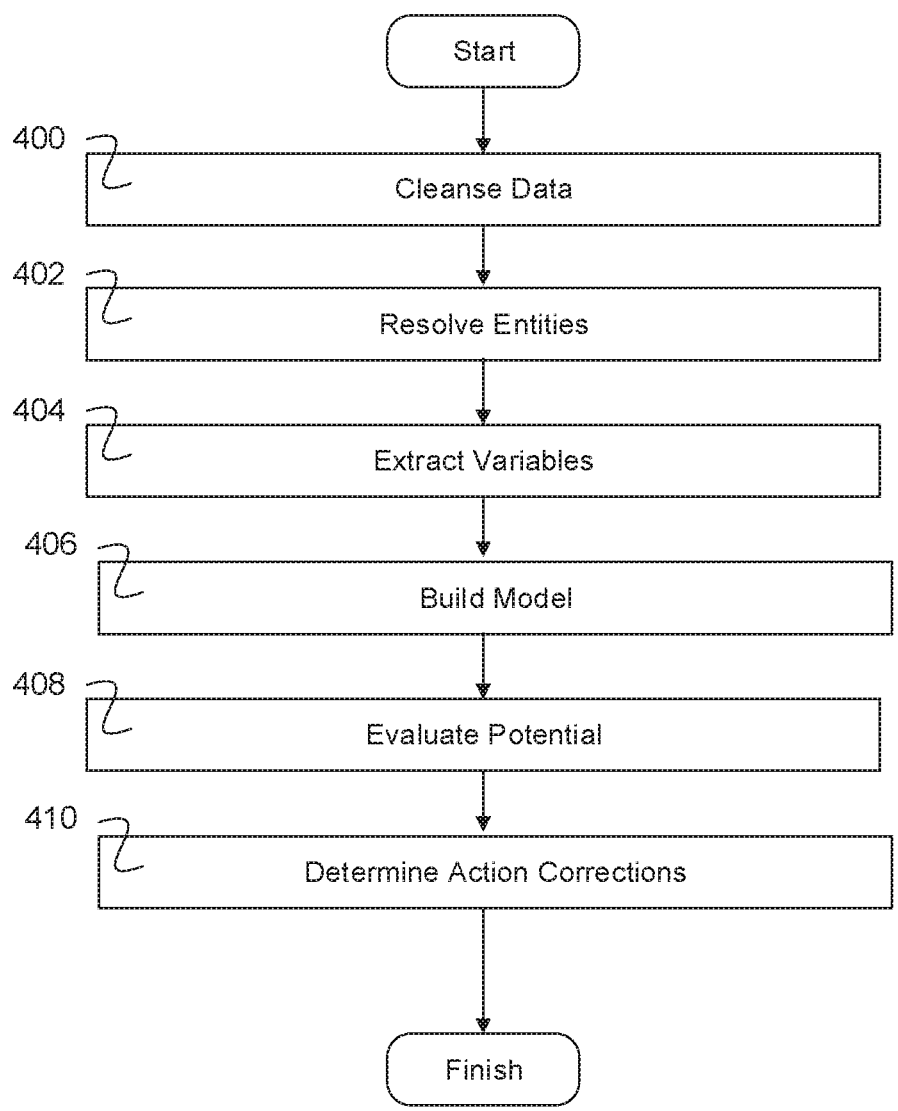
FIG. 4 is a flow diagram illustrating an embodiment of an action corrections system process.

FIG. 4 is a flow diagram illustrating an embodiment of an action corrections system process. In 400, data is cleansed. In some embodiments, data cleansing occurs at multiple steps in the process. In 402, entities are resolved. In 404, variables are extracted. In some embodiments, the majority of the data cleansing, entity resolving, and variable extracting is done only once or is not repeated. For example, entity profiles may be created for all entities serviced by the client using cleansed data. Variables may be extracted from cleansed data and stored in the data corrections system. Upon receiving a model request for a client and a response variable, the action corrections system may select a subset of the extracted variables to build the model. Upon receiving a request for a different response variable and the same client, a different subset of the extracted variables may be used to build the model. However, data cleansing and entity profile creation may not need to happen anew. In some embodiments, the generic data or proprietary data are scraped for updates periodically. In some embodiments, the correct actions system is able to provide quick, on-the-fly models after an initial set-up. In some embodiments, the majority of the entity profile information is extracted from generic data and can be used for multiple clients.

In 406, a model is built. In various embodiments, the model is created for various response variables or clients. In some embodiments, an action model is a model wherein the explanatory variables considered are restricted to actionable features. In various embodiments, the response variable or explanatory variables are restricted or determined topically. In 408, potential is evaluated. In 410, action corrections are determined. In some embodiments, action corrections are determined based on the potential (e.g. action corrections will not be determined in the event the potential indicates they are not required). In some embodiments, an action model is built and action corrections are determined based on the action model.

Figure 5:
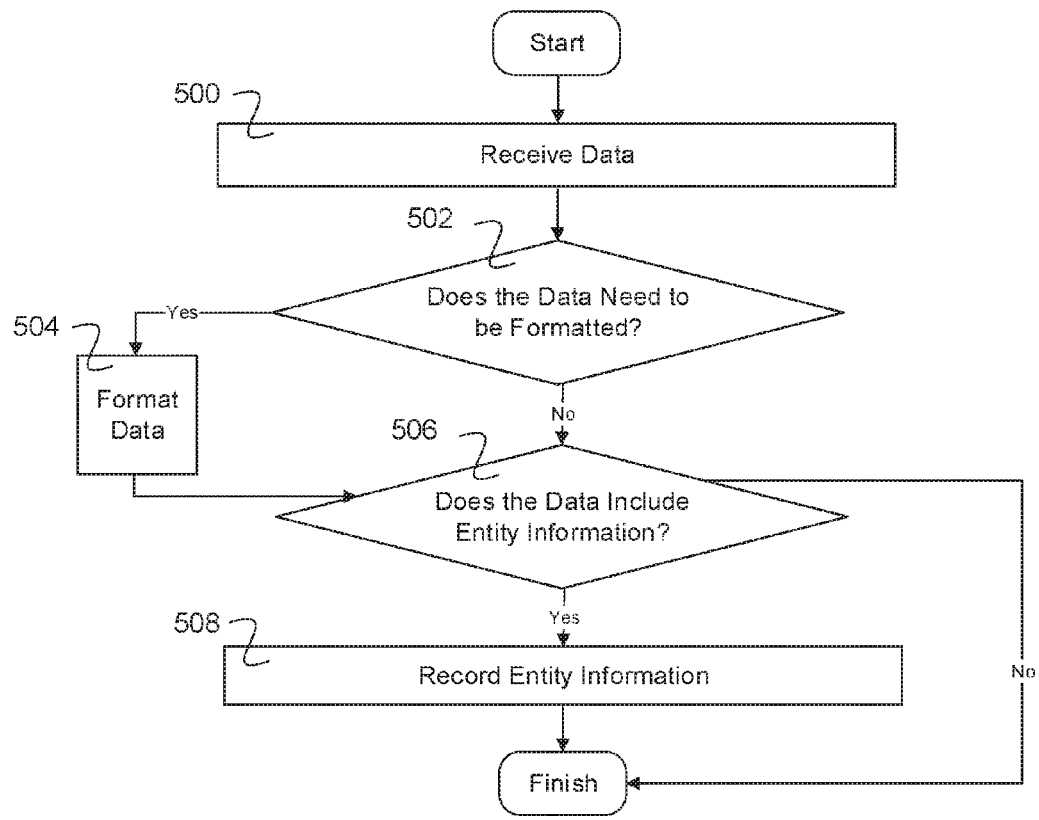
FIG. 5 is a flow diagram illustrating an embodiment of a data cleanser process.

FIG. 5 is a flow diagram illustrating an embodiment of a data cleanser process. In 500, data is received. In 502, it is determined whether the data needs to be formatted. In some embodiments, formatting comprises deleting white spaces, processing comma separated files, transforming matrices, or any other appropriate formatting. In the event that data needs to be formatted, in 504 the data is formatted. In the event the data does not need to be formatted or the data has been formatted, in 506 it is determined whether the data includes entity information. For example, entity information may comprise a descriptor of a company, person, or group of people. In the event that the data does not include entity information, the process is finished. In some embodiments, the action correction systems uses entity-based information or information that is at least tangentially related to one or more entities. For example, response variable information and action information is related to one or more entities. In the event the data does include entity information, the entity information is recorded in 508 and the process is finished.

In some embodiments, publically available data, purchased data, client data, or any other appropriate data is stored in the action corrections system for the data cleanser to process. In some embodiments, all data that is received by the data cleanser requires formatting.

Figure 6:
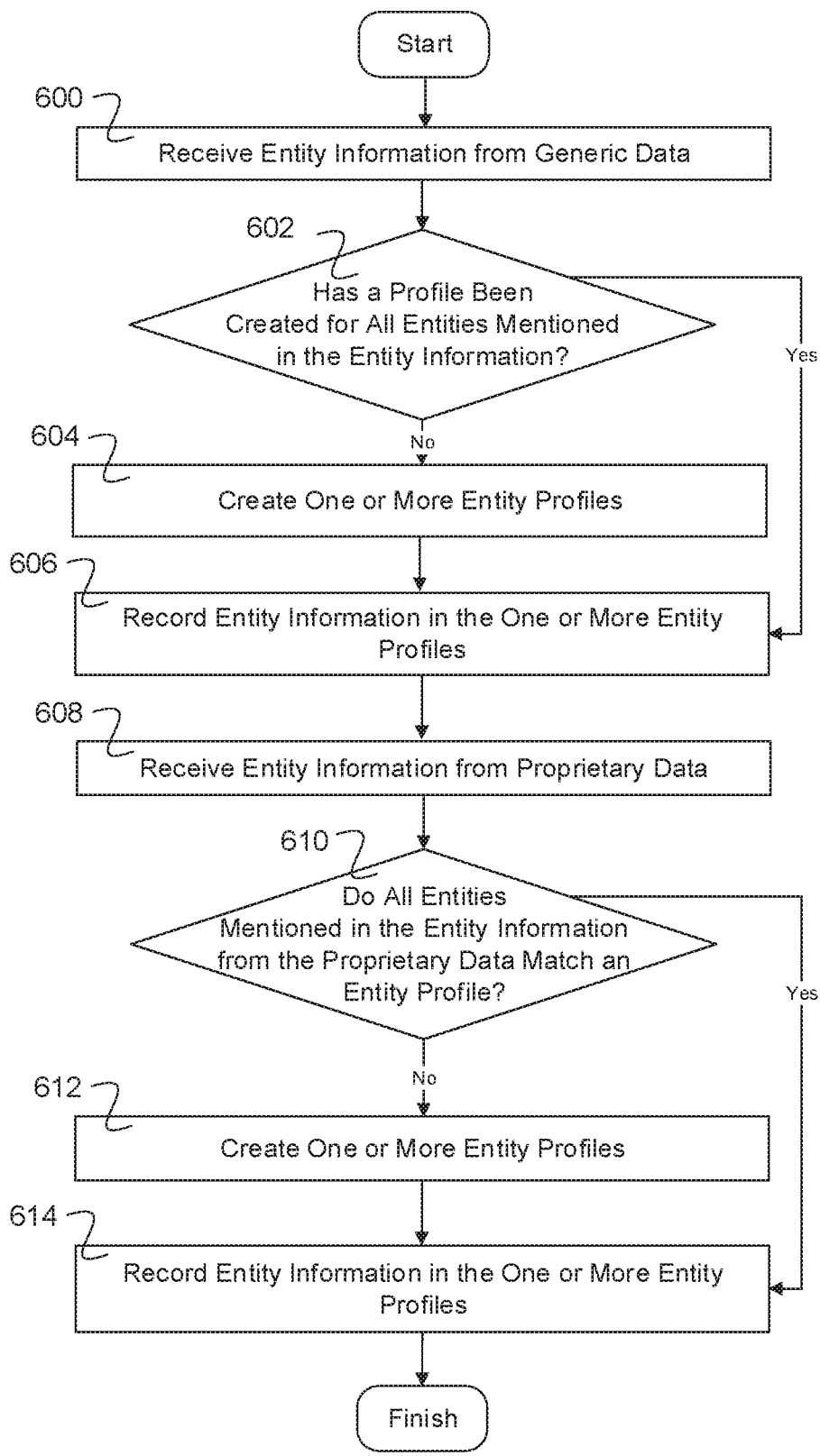
FIG. 6 is a flow diagram illustrating an embodiment of an entity joiner process.

FIG. 6 is a flow diagram illustrating an embodiment of an entity joiner process. In 600, entity information from generic data is received. In 602, it is determined whether a profile has been created for all entities mentioned in the entity information. In some embodiments, 602 is performed periodically or on a regular maintenance schedule. In the event that a profile has not been created for all entities mentioned in the entity information, in 604 one or more entity profiles are created. The entity profiles may be saved in the action corrections system. The entity profiles may comprise a canonical list. In some embodiments, the fields of the entity profile vary based on the entity type. In the event a profile has been created for all entities mentioned in the entity information or the one or more entity profile have been created, in 606 entity information is recorded in the one or more entity profile. In some embodiments, all entity information is matched up to an entity profile based on identifying information. The entity profile may comprise variables that are later used to build a model.

In some embodiments, data is matched based on an address, name, an IP address, or any other appropriate information. In some embodiments, entity information is consolidated using a matching process. The matching process may be used to determine that data received from different sources is referencing the same entity. For example, addresses may be converted to a latitude and longitude format before comparison. In the event the entity is situated in a building with multiple addresses and different sources reference different addresses, the entity information from the different sources can be compiled in one entity profile. Multiple variations of names or acronyms may be used to determine a match. In some embodiments, entity joining is executed different based on an entity type. For example, an entity that is determined to be academic may be examined carefully as to create a hierarchical identification. For example, an entity profile may specify the United States government, the Department of Energy, and a national laboratory. In some embodiments, detailed entity joining allows a potential to be determined for each of the hierarchical entity levels (e.g. the university system level or university campus level).

In 608, entity information from proprietary data is received. In 610, it is determined whether all entities mentioned in the entity information from the proprietary data match an entity profile. In the event not all entities mentioned in the entity information from the proprietary data match an entity profile, in 612 one or more entity profiles are created. In some embodiments, in the event the proprietary data does not match an entity profile, a check is performed to ensure up to date generic data was used. In the event all entities mentioned in the entity information from the proprietary data match an entity profile or one or more entities profiles are created, in 614 entity information is recorded in the one or more entity profiles. In some embodiments, an identifying account number which the client uses in reference to the entity is stored in the entity profile. In some embodiments, steps 608, 610, 612, and 614 are executed for each client of the action corrections system.

Figure 7:
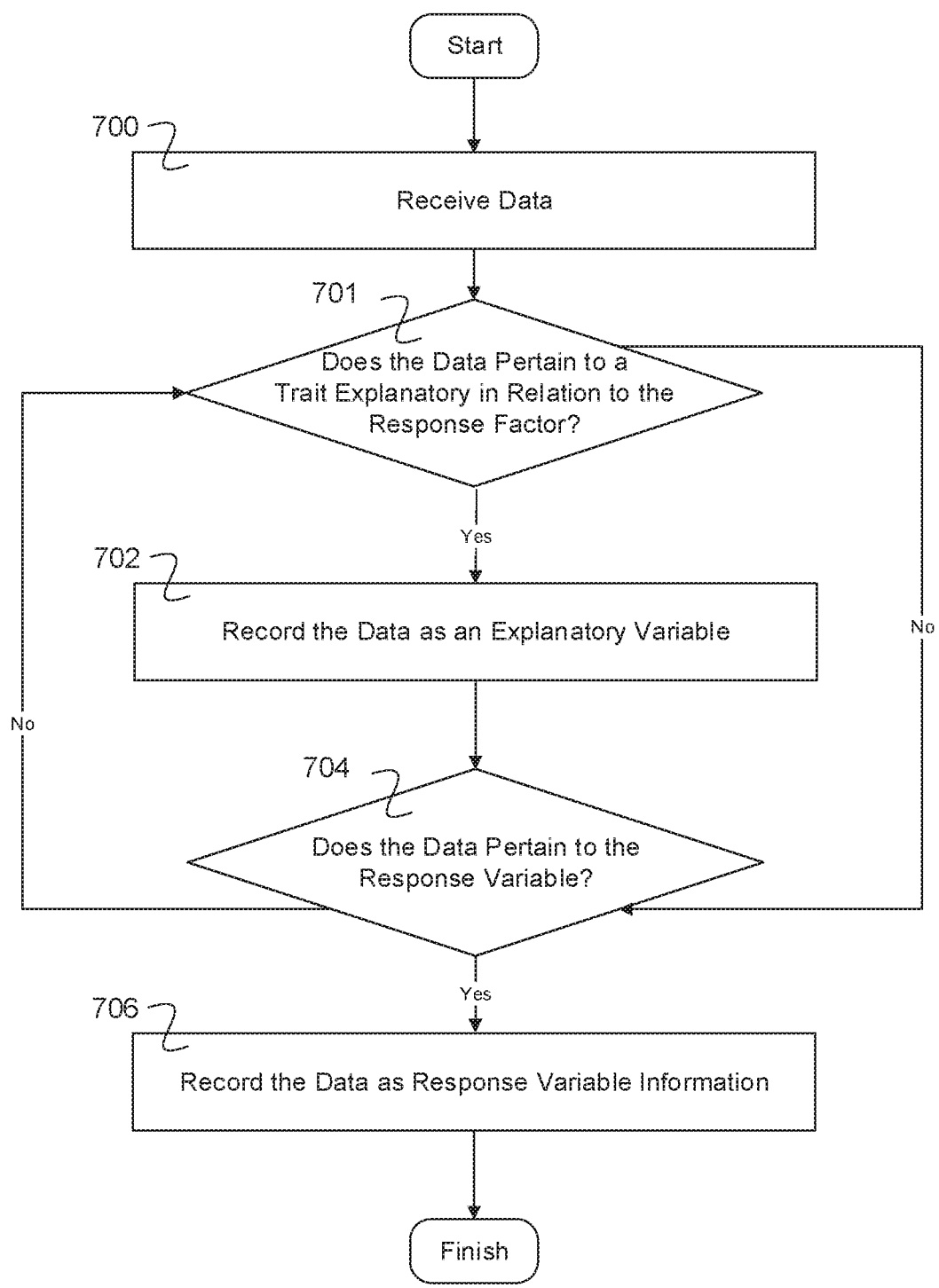
FIG. 7 is a flow diagram illustrating an embodiment of a variable extractor process.

FIG. 7 is a flow diagram illustrating an embodiment of a variable extractor process. In 700, data is received. In 701, is it determined whether the data pertains to a trait independent of relation to the response variable. In the event that the data pertains to a trait independent of the response variable, in 702 the data is recorded as an explanatory variable. In the event the data does not pertain to a trait independent of the response variable or the data is recorded as an explanatory variable, in 704 it is determined whether the data pertains to the response variable. In the event it is determined that the data does not pertain to the response variable, the process returns to 701. In the event that the data does pertain to the response variable, in 706 data is recorded as response variable information. In some embodiments, prior to 701, the data is organized and stored as variables and upon receiving a response variable, the explanatory variables and response variable information is retrieved from the entire set of variables. In some embodiments, 701, 702, 704, and 706 are performed each time a model is requested for a different response variable. In some embodiments determining the potential for different entities based on the same response variable may require 701, 702, 704, and 706 to be performed only once. One model may be created and the model may be used to determine a predicted performance for each of the entities based on the entity information. In some embodiments, a client is provided with an interactive user interface that allows the client to request different models or different entity predictions.

In some embodiments, the explanatory variables include a topic identifier or an entity type. For example, a website may include trigger words related to the field of data mining in its description of an entity. The action corrections system may log that entity with a topic identifier of "data mining." In some embodiments, topic identifiers are a level of data analysis instated to create more accurate or detailed models. An entity type may include academic, corporate, international, independent, or any other entity type. In some embodiments, an entity profile is organized as a list of variables pertaining to each entity. For example, an entity profile may list a server productivity level, an entity type, a categorical label, and a number of servers. In some embodiments, the variable extractor indicates that variables listed as part of an entity profile that are not the response variable are explanatory variables.

Figure 8:
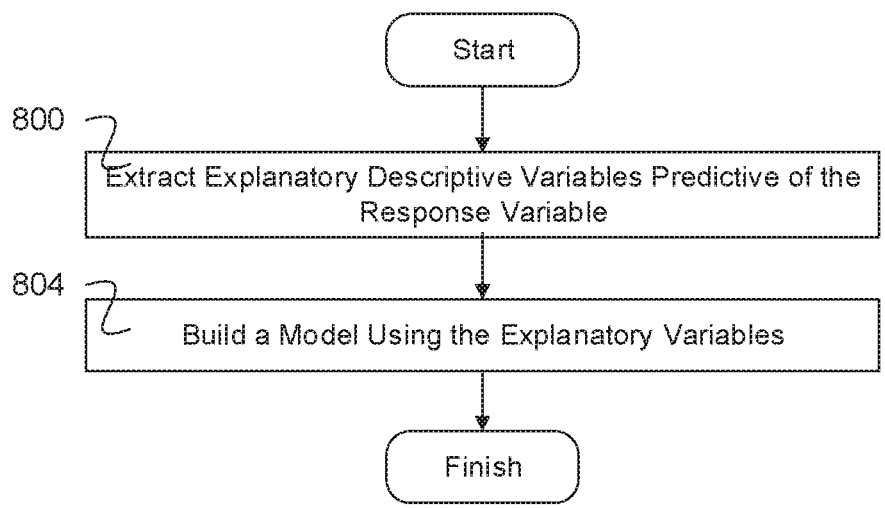
FIG. 8 is a flow diagram illustrating an embodiment of a model builder process for a descriptive model.

FIG. 8 is a flow diagram illustrating an embodiment of a model builder process for a descriptive model. In 800, explanatory variables predictive of the response variable are extracted. In some embodiments, explanatory variables that are determined to cause a desirable outcome in terms of the response variable are extracted. Machine learning, statistical models, or client logs may be used to extract the relevant or desired variables. In some embodiments, a variable must be predictive of entities performances in general to be selected as useful. In 804, a model is built using the explanatory variables. In some embodiments, inputs to the model include the entity's relevant explanatory variables. In some embodiments, the model outputs a prediction of the entity's response variable along with the impact of each of the relevant explanatory variables for the entity. Each entity may have a different amount of influence from each explanatory variable. The model may reflect that various explanatory variables vary in levels of influence over a given entity's performance as measured in terms of the response variable.

Figure 9:
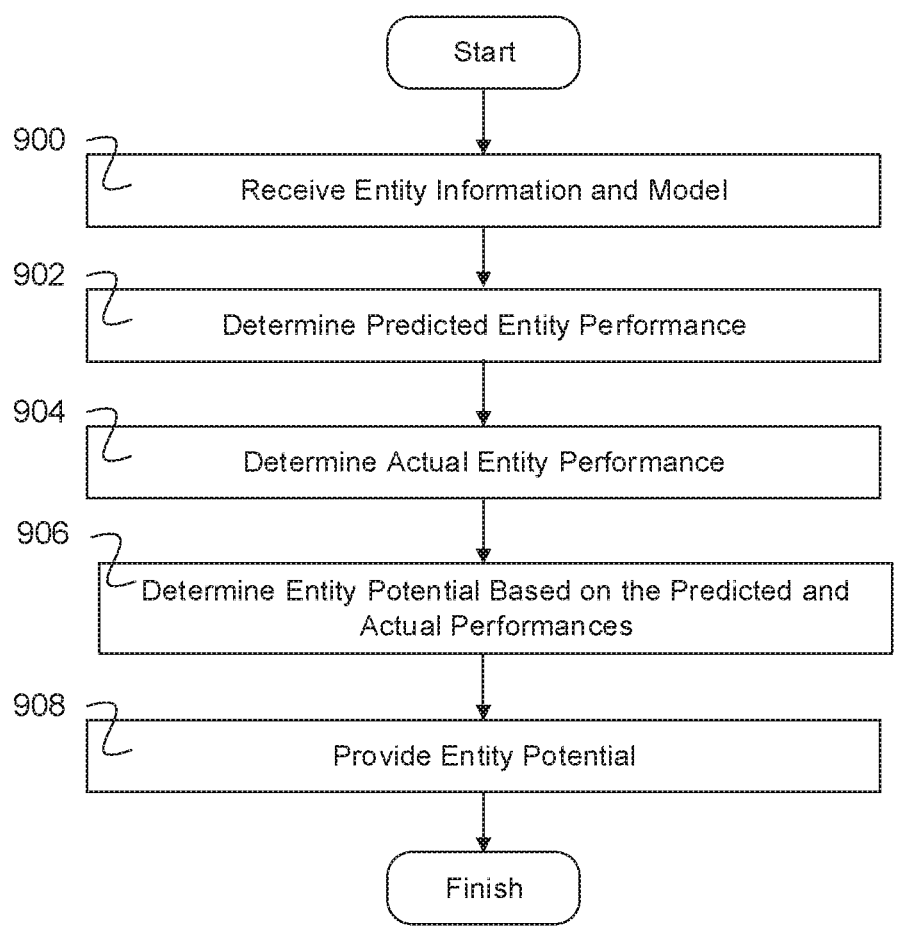
FIG. 9 is a flow diagram illustrating an embodiment of a potential generator process.

FIG. 9 is a flow diagram illustrating an embodiment of a potential generator process. In some embodiments, models that are requested to be built for a client for a response variable are saved to the action corrections system. In the event a potential is requested for an entity, the potential generator process begins. In some embodiments, the model is rebuilt in the event the model stored in the action corrections system is older than a predetermined threshold. For example, a client may specify that models are to be rebuilt if they are older than one week in order to maintain accuracy in predictions. Rebuilding the model may include updating the model based on the most recently updated generic and proprietary data. The threshold may vary based on accuracy and computing resources constraints. In 900, entity information and a model is received. In some embodiments, the model received is a response variable model created by the model builder. In 902, predicted entity performance is determined. The entity performance may be predicted based on a statistical or machine learning mode. In some embodiments, the entity performance is predicted by fitting the entity to the model based on the entity's information and descriptors. In 904, actual entity performance is determined. In some embodiments, actual entity performance in regards to the response variable is extracted from the proprietary data. In 906, entity potential based on the predicted and actual performances is determined. In 908, entity potential is provided. For example, an entity may be predicted to use ninety percent of its allocated servers but actually uses fifty percent. In embodiments wherein the potential is calculated as the difference between those percentages, the potential may be determined to be forty percent. In some embodiments, the potential is calculated as the ratio of those percentages and is determined to be a 2.25 multiple of actual performance. In some embodiments, a threshold point of potential indicates that the entity is performing as expected, exceeding that threshold indicates existence of an opportunity to improve performance, and falling short of that threshold indicates that the entity. In some embodiments, the entity is not currently serviced by the client of the action corrections system. As such, there is proprietary information concerning the actual performance of the entity and the potential may refer to the predicted performance relative to a generic baseline. The actual entity performance may be inferred as though the client had never taken actions on the entity and the entity never interacted with the client.

Figure 10:
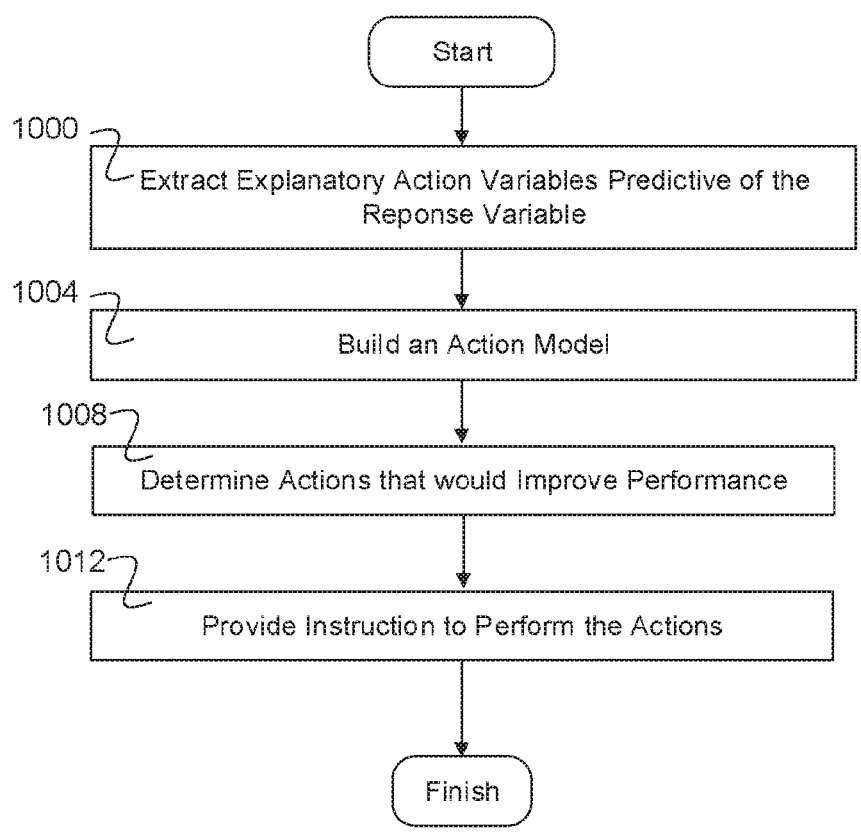
FIG. 10 is a flow diagram illustrating an embodiment of a model builder process for action corrections.

FIG. 10 is a flow diagram illustrating an embodiment of a model builder process for action corrections. In 1000, actions that are predictive of the response variable are extracted. In 1004, an action model is built. In some embodiments, the action model is built using the same processes as the descriptive model. In some embodiments, a different machine learning system, algorithm, or statistical model is used to build the action model. In some embodiments, the action model provides information on actions that are positively predictive or negatively predictive of the response variable. In some embodiments, causation is used in determining the variables that the model is built on. In 1008, actions that would improve performance are determined. In some embodiments, the action is derived from a trait determined to be predictive of or causally related to the response variable. For example, entities that use a first type of specially configured server may be likely to use a second type of specially configured server. A client may be suggested to provide the first type of specially configured server for free to an entity in order to promote use of the second type of specially configured server. The combination of the two servers used in combination may preserve overall power that the client must provide to the entity. The response variable may be power use, wherein a low power use constitutes high performance. In 1012, instruction to perform the actions is provided and the process is finished.

Figure 11:
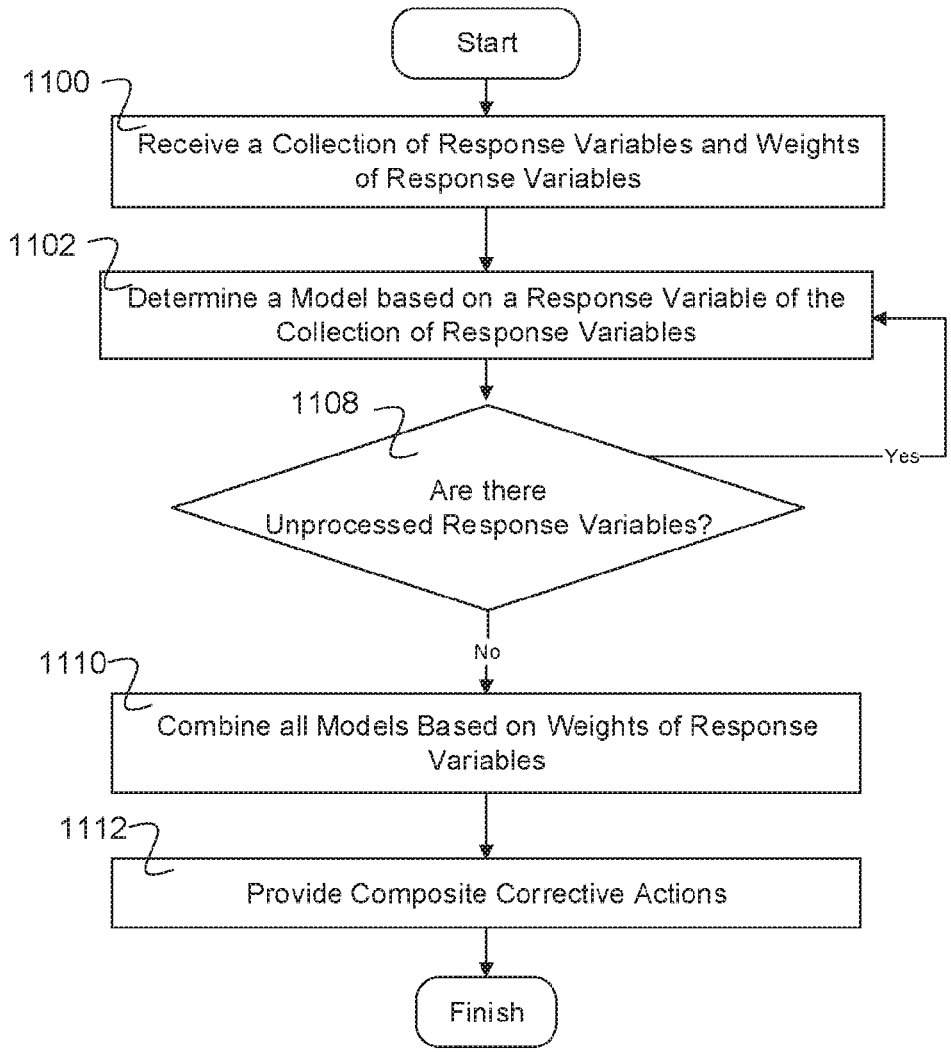
FIG. 11 is a flow diagram illustrating an embodiment of a model builder process for multiple response variables.

FIG. 11 is a flow diagram illustrating an embodiment of a model builder process for a collection of response variables. In the example shown, the model builder constructs an action model. In 1100, response variables and weights or response variables are received. In some embodiments, the response variables comprise a figure or metric of merit. For example, a client may desire to decrease the power consumption of the servers it provides to multiple entities and as a secondary requirement, desires that the entities use a high percentage of the servers they are allocated (e.g. to be able to service new entities with the freed servers). In 1102, a model based on a response variable of the collection of response variables is determined. For example, the model builder may construct a model based on power consumption. In 1108, it is determined whether there are unprocessed response variables. In the event that there are unprocessed response variables, the process returns to 1102. The model builder may iterate in order to create an action model based on each response variable. In some embodiments, separate models are created for all the response variables simultaneously. In the event that there are no unprocessed response variables, in 1110 all models are weighted. The models may be weighted based on the weights of the response variables as indicated by the client. In 1112, composite corrective actions are provided. The composite corrective actions may be determined in order to maximize overall performance of the entity, wherein the overall performance is designated as a combination of the response variables. For example, the overall performance of the entity may be measured by 80% total revenue generated via the entity and 20% revenue generated via sale of a specific product to the entity. In some embodiments, the composite corrective actions are further combined in 1110 with corrective actions determined via a different system, such as a collaborative filtering model, a separate instantiation of an action correction system based on different generic or proprietary data, or based on different levels of granularity of predictions of entity potentials. In some embodiments, only actions that are suggested by aggregations of action recommendation are provided to the client.

In some embodiments, the action corrections system is used by client corporations that sell products to entities. In some embodiments, the action corrections system is used by a client that provides computing services to multiple entities. The response variables may be targeted at providing the entities with their required services while minimizing power constraints, freeing up servers, minimizing the number of servers that must be reconfigured to provide a new specialized service, or any other computing requirement. In some embodiments, the response variables considered in determining action corrections are revenue, a number of units of a new product sold, or other quantifiable benchmarks. In some embodiments, proprietary data comprises information that is owned by the client corporation.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for action correction comprising:
an interface configured to receive generic data and proprietary data; and
a processor configured to:
cleanse the generic data, wherein cleansing the generic data comprises one or more of the following: parsing the generic data, determining an entity identifying information, determining an entity hierarchical level, determining an entity category, determining a subject matter, or grouping by subject matter;
determine a generic data entity;
match the generic data entity to a proprietary data entity to form a joined entity;
determine a response variable from the proprietary data;
determine a need for action corrections in regards to the joined entity based at least in part on the response variable; and
determine one or more action corrections in regards to the joined entity.

2. The system of claim 1, wherein the generic data comprises one or more of the following: a website, a public database, a published paper, an organization, an author, or information on one or more entities.

3. The system of claim 1, wherein the processor cleanses the generic data.

4. The system of claim 1, wherein the generic data entity is matched to the proprietary data entity in the event a generic data entity identifying information of the generic data entity is the same as a proprietary entity identifying information of the proprietary data entity.

5. The system of claim 1, wherein the generic data entity is matched to the proprietary data entity based on an entity hierarchical level.

6. The system of claim 1, wherein an entity profile is created for the joined entity based on the generic data and the proprietary data.

7. The system of claim 6, wherein a potential is generated for the joined entity based on one or more variables extracted from the generic data that are predictive of the response variable and the entity profile.

8. The system of claim 1, wherein the processor extracts one or more variables from the generic data, wherein the one or more variables pertain to one or more entities.

9. The system of claim 1, wherein the processor extracts one or more variables from the generic data, wherein the one or more variables are predictive of the response variable.

10. The system of claim 1, wherein the processor determines one or more explanatory variables that are predictive of the response variable.

11. The system of claim 1, wherein a potential is generated for the joined entity based on one or more variables extracted from the generic data that are predictive of the response variable.

12. The system of claim 11, wherein the potential is generated based on an actual performance of the joined entity.

13. The system of claim 11, wherein the need for action corrections is determined based on the potential.

14. The system of claim 1, wherein the one or more action corrections are determined in the event the need for action corrections is determined to exceed a threshold.

15. The system of claim 1, wherein action information pertaining to the joined entity is extracted from the proprietary data.

16. The system of claim 15, wherein the one or more action corrections are determined based on variables extracted from the action information that are determined to be predictive of an improved performance.

17. The system of claim 1, wherein the one or more action corrections are determined based on multiple response variables, wherein the multiple response variables are weighted.

18. A method for action correction, comprising:
- receiving generic data and proprietary data;
- cleansing the generic data, wherein cleansing the generic data comprises one or more of the following: parsing the generic data, determining an entity identifying information, determining an entity hierarchical level, determining an entity category, determining a subject matter, or grouping by subject matter;
- determining, using a processor, a generic data entity;
- matching the generic data entity to a proprietary data entity to form a joined entity;
- determining a response variable from the proprietary data;
- determining a need for action corrections in regards to the joined entity based at least in part on the response variable; and
- determining one or more action corrections in regards to the joined entity.

19. A computer program product for action correction, the computer program product being embodied in a non-transitory computer readable storage medium and comprising computer instructions for:
- receiving generic data and proprietary data;
- cleansing the generic data, wherein cleansing the generic data comprises one or more of the following: parsing the generic data, determining an entity identifying information, determining an entity hierarchical level, determining an entity category, determining a subject matter, or grouping by subject matter;
- determining a generic data entity;
- matching the generic data entity to a proprietary data entity to form a joined entity;
- determining a response variable from the proprietary data;
- determining a need for action corrections in regards to the joined entity based at least in part on the response variable; and
- determining one or more action corrections in regards to the joined entity.

* * * * *

UNITED STATES PATENT AND TRADEMARK OFFICE
CERTIFICATE OF CORRECTION

| | | |
|---|---|---|
| PATENT NO. | : 10,474,649 B2 | Page 1 of 1 |
| APPLICATION NO. | : 15/277940 | |
| DATED | : November 12, 2019 | |
| INVENTOR(S) | : Austen Head et al. | |

It is certified that error appears in the above-identified patent and that said Letters Patent is hereby corrected as shown below:

In the Drawings
In sheet 5, figure 5, insert the title of --Data Cleanser Flow--, therefor.
In sheet 6, figure 6, insert the title of --Entity Joiner Flow--, therefor.
In sheet 7, figure 7, insert the title of --Variable Extractor Flow--, therefor.

Signed and Sealed this
Thirty-first Day of March, 2020

Andrei Iancu
*Director of the United States Patent and Trademark Office*